United States Patent [19]
Nishibori

[11] Patent Number: 5,738,286
[45] Date of Patent: Apr. 14, 1998

[54] RESIN MATERIAL RECOVERED FROM INDUSTRIAL WASTES OF PLASTIC FILM, METHOD AND APPARATUS FOR RECOVERING RESIN MATERIAL FROM INDUSTRIAL WASTES OF PLASTIC FILM

[75] Inventor: Sadao Nishibori, Tokyo, Japan

[73] Assignee: EIN Engineering Co., Ltd., Tokoy, Japan

[21] Appl. No.: 606,318

[22] Filed: Feb. 23, 1996

[51] Int. Cl.⁶ .......................... B02C 19/12; B02C 23/08
[52] U.S. Cl. ...................... 241/24.14; 241/24.18; 241/79.1; 241/152.2; 241/DIG. 38
[58] Field of Search .................. 241/24.14, 24.18, 241/24.28, 74, 77, 79, 79.2, 80, 87.1, 27, 29, 92, 152.2, DIG. 38, 79.1

[56] References Cited

U.S. PATENT DOCUMENTS

| | | | |
|---|---|---|---|
| 2,879,005 | 3/1959 | Jarvis | 241/24.18 X |
| 4,251,034 | 2/1981 | Corr et al. | 241/24.18 X |
| 5,257,740 | 11/1993 | Prew et al. | 241/29 X |
| 5,277,758 | 1/1994 | Brooks et al. | 241/24.18 X |
| 5,301,881 | 4/1994 | Hayashi et al. | 241/24.18 X |
| 5,323,971 | 6/1994 | Nishibori et al. | 241/3 |
| 5,510,076 | 4/1996 | Brooks | 264/437 |
| 5,566,888 | 10/1996 | Yamamoto | 241/24.28 X |

FOREIGN PATENT DOCUMENTS

| | | |
|---|---|---|
| 0542593 | 5/1993 | European Pat. Off. . |
| 0689882 | 1/1996 | European Pat. Off. . |
| 3175008 | 7/1991 | Japan . |
| 4006292 | 7/1991 | Japan . |
| 6-106536 | 4/1994 | Japan ............. 241/29 |
| 6-134759 | 5/1994 | Japan ............. 241/24.28 |
| 2 267 048 | 11/1993 | United Kingdom ......... 241/24.28 |

*Primary Examiner*—John M. Husar
*Attorney, Agent, or Firm*—Joseph C. Mason, Jr.

[57] ABSTRACT

A resin material is recovered for recycling from industrial waste of plastic film, unlike conventional methods, without requiring washing and drying the steps for removing foreign objects adhering thereto such as agricultural chemicals. A method for recovering a resin material from industrial waste film according to the invention comprises the steps of crushing waste film into crushed small pieces to be treated, applying a scraping impact force to the crushed small pieces to remove any adherent foreign objects and separate them from each other. Then, the separated crushed small pieces are size-regulated and for regeneration.

11 Claims, 6 Drawing Sheets

RESIN MATERIAL RECOVERED FROM INDUSTRIAL WASTES OF PLASTIC FILM, METHOD AND APPARATUS FOR RECOVERING RESIN MATERIAL FROM INDUSTRIAL WASTES OF PLASTIC FILM

BACKGROUND OF THE INVENTION

1. Field of the Invention

This invention relates to a resin material recovered from industrial wastes of molded resin articles as well as to a method and an apparatus for recovering a resin material from the industrial wastes of molded resin articles.

More particularly, the present invention may suitably be applied to processing wastes of plastic film or sheets that may be as thin as film and those that are thicker (hereinafter collectively referred to as plastic "film") used in the field of agriculture and other industries and it provides a resin material by crushing in the broad sense the waste film into a plurality of small pieces to be treated, and separating as well as removing rain water, dew drops, mud, dirt, sand, salts, grass roots, metal particles, glass debris, dusts, agricultural chemicals, debris of agricultural crops (leaves, stalks) and other foreign objects adhering to the film.

The present invention also provides a method and an apparatus for regenerating as a raw form of resin material by classifying the pieces of the recovered resin material by size and collecting those within predetermined dimensional range so that they may be appropriately recycled to directly mold any products or to form pellets.

Sources of industrial wastes of plastic film include, for example, agricultural plastic film popularly used in cultivating vegetables, flowers, rice plants and other plants. More specifically, plastic film is used for seeding tunnels, forcing tunnels, green houses, rice seeding paddies, vinyl-roofed field and rice paddies and other agricultural applications. Other sources of industrial wastes of plastic film include silos for tobacco seeding, for drying tobacco leaves and for raising of livestock as well as bags for feed and chemicals.

The above mentioned plastic film includes thermoplastic film made of polyethylene, polyvinylacetate, polyolefin, polypropylene, polyvinylalcohol and polyvinylchloride. (In this specification, plastic film those used in the agricultural industry are totally referred to "agricultural wastes of plastic film".) In Japan, a total of 193,170 tons of agricultural wastes of plastic film was rejected in 1993, of which 69.4% came from ones post-used for vegetables, 5.2% from for flowers, 7.0% from for fruits, 10.1% from fields or trucks, 4.2% from for rice paddies and 4.0% from for other sources.

2. Description of the Prior Art

Industrial wastes of plastic film among waste molded resin articles particularly agricultural waste of plastic film made of polyethylene (PE), polycarbonate (PC) and polyvinylchloride (PVC), particularly soft PVC containing plasticizers such as DOP and DOA by 20 to 40% used in Japan, stain mud, dirt, sand, debris of metal, glass and dusts. In the case of sheets of plastic film used for agricultural industrial wastes at an enhanced rate are brought about because they can quickly lose transparency as debris of crops (leaves, stalks) adhere to them. Such wastes of plastic film have hitherto been generally collected for exchange and simply dumped for land reclamation or incinerated. In some cases, they are washed to remove the adherent foreign objects, dried and pulverized or recycling as a material resource.

Of the 193,170 tons of agricultural wastes of plastic film of polyvinylchloride (PVC) and polyethylene (PE) rejected or dumped in 1993 in Japan, 25.9% was processed for recycling, 20.9% was reclaimed, 43% was incinerated and 10.2% was simply dumped. Private incineration were 65.8% for polyethylene film. In classifying, polyvinylchloride and polyethylene film accounted for 54.8% and 40.5%, respectively and the rest is other plastic film in the balance of the agricultural waste.

Industrial wastes of plastic film are resistant against moisture and hard weather and would not erode easily. When burnt, on the other hand, they produce harmful gas and fume at an enhanced rate to adversely affect the environment. What is worse, they often melt before they are burnt and stick to the wall of the furnace of the incinerator to damage the furnace. If they are reclaimed to avoid these disadvantages, they remain there for a prolonged period of time without eroding and also adversely affect the environment.

Meanwhile, natural resources for plastic materials are believed to be on the way toward exhaustion or depletion and hence there is a persistent social and industrial demand for the recycling of plastic wastes without dumping.

Conventionally, industrial wastes of plastic film have been washed with water to remove adherent foreign objects in order to regenerate them but such an operation of washing with water involves a washing step consuming a large amount of water and a subsequent drying step, requiring large washing and drying facilities that consume precious resources of water and energy.

Particularly, agricultural wastes of plastic film normally carry agricultural chemicals and, if they are washed with water, the used water then has to be treated to remove the agricultural chemicals contained in order to avoid contamination of rivers and groundwater. Obviously, such treatment requires large facilities and is hence costly. Thus, almost all of agricultural wastes of plastic film have hitherto been dumped or otherwise thrown away without being utilized as a secondary resource.

In view of the above identified problems, it is therefore an object of the present invention to provide a resin material efficiently recovered from industrial wastes of plastic film into resin materials to be regenerated by separating and removing chemicals, mud, dirt, sand, metal particles, debris of agricultural crops (leaves, stalks), glass debris and other foreign objects adhering to the film, classifying those pieces within predetermined dimensional ranges and forming granules from them as well as to provide a method and an apparatus for recovering a resin material from industrial wastes.

SUMMARY OF THE INVENTION

According to the invention, the above object and other objects of the invention are achieved by providing a resin material recovered from industrial waste of plastic film (hereinafter simply referred to "waste film") by crushing waste film into a plurality of small pieces to be treated, applying a scraping impact force to the individual pieces to separate the resin material and the adhering foreign objects and regulating the sizes of the resin material as a raw form.

According to the invention, there is also provided a method of recovering a resin material from waste film comprising steps of:

crushing waste film into a plurality of small pieces to be treated; and applying a scraping impact force to the crushed individual pieces to be treated to separate the pieces of the resin material and the adhering foreign objects and regulating the sizes of the pieces of the resin material.

According to another aspect of the invention, the above step of crushing waste film is preceded by at least a step of crushing the waste film into coarsely crushed pieces.

According to still another aspect of the invention, there is provided an apparatus for recovering a resin material from waste film comprising:

crushing means for crushing waste film into a plurality of small pieces to be treated;

stationary-side separating, classifying and size-regulating means arranged on a fixed disc having a central opening communicating with a feeding inlet port and provided with sequentially arranged fixed pins on a plurality of circular loci of rotation;

movable-side separating, classifying and size-regulating means arranged on a movable disc rotatably disposed opposite to said fixed disc and provided with sequentially arranged movable pins on a plurality of loci of rotation different from said fixed pins;

Classifying means arranged on the perimeter of the combined fixed and movable pins and communicating with a discharge port for freely discharging separated adherent foreign objects with sizes smaller than a given size; and collecting means for collecting recovered pieces of a resin material with sizes greater than a given size at a collection port;

the pieces of the resin material are separated from the adherent foreign objects by applying a scraping impact force to them between each of the paired fixed and movable pins, sorted and regulated for size in separating, classifying and size-regulating means.

An apparatus for recovering a resin material from waste film according to the invention may additionally comprise coarsely crushing means arranged upstream to said crushing means for coarsely crushing waste film to be treated.

An apparatus for recovering a resin material from waste film according to the invention may preferably comprise a piping communicating with said collection port and said feeding inlet port so that said small pieces collected at the collection port for treatment may be fed back to said feeding inlet port.

With an apparatus for recovering a resin material from waste film according to the invention and having a configuration as described above, waste film is coarsely crushed into coarse pieces by said coarsely crushing means and then crushed further into small pieces to be treated by said crushing means, which are then fed to the feeding inlet port of the separating, classifying sorting and size-regulating means once or more than once so that they are crushed into small pieces, which are polished and regulated for size between each of the paired fixed and movable pins, classified and regulated for size, while any adherent foreign objects with sizes smaller than a given size can be sorted and discharged from the discharge port and pieces of the resin material with sizes greater than a desired size can be collected from the collection port.

BRIEF DESCRIPTION THE DRAWINGS

The objects and advantages of the invention will become apparent from the following detailed description of preferred embodiments thereof provided in connection with the accompanying drawings throughout which like numerals denote like elements and in which.

DETAILED DESCRIPTION OF THE PREFERRED EMBODIMENTS

A Method and an Appratus For Treating a Resin Material Waste Resin Material To Be Treated Waste molded resin that can be treated by the method include waste film of polyethylene and polyvinychloride (soft) and other plastic materials. Pieces of waste film stain mud, dirt, sand, debris of metal, glass and crops (leaves, stalks) and other foreign objects adhering to them. While waste film may be neatly rolled up, in some cases when collected by collectors, it is mostly collected in the form of crumpled masses.

Now, the means for recovering a resin material of polyethylene and other plastic ingredients from such crumpled masses of waste film is explained.

Treating Process

Figure 1:
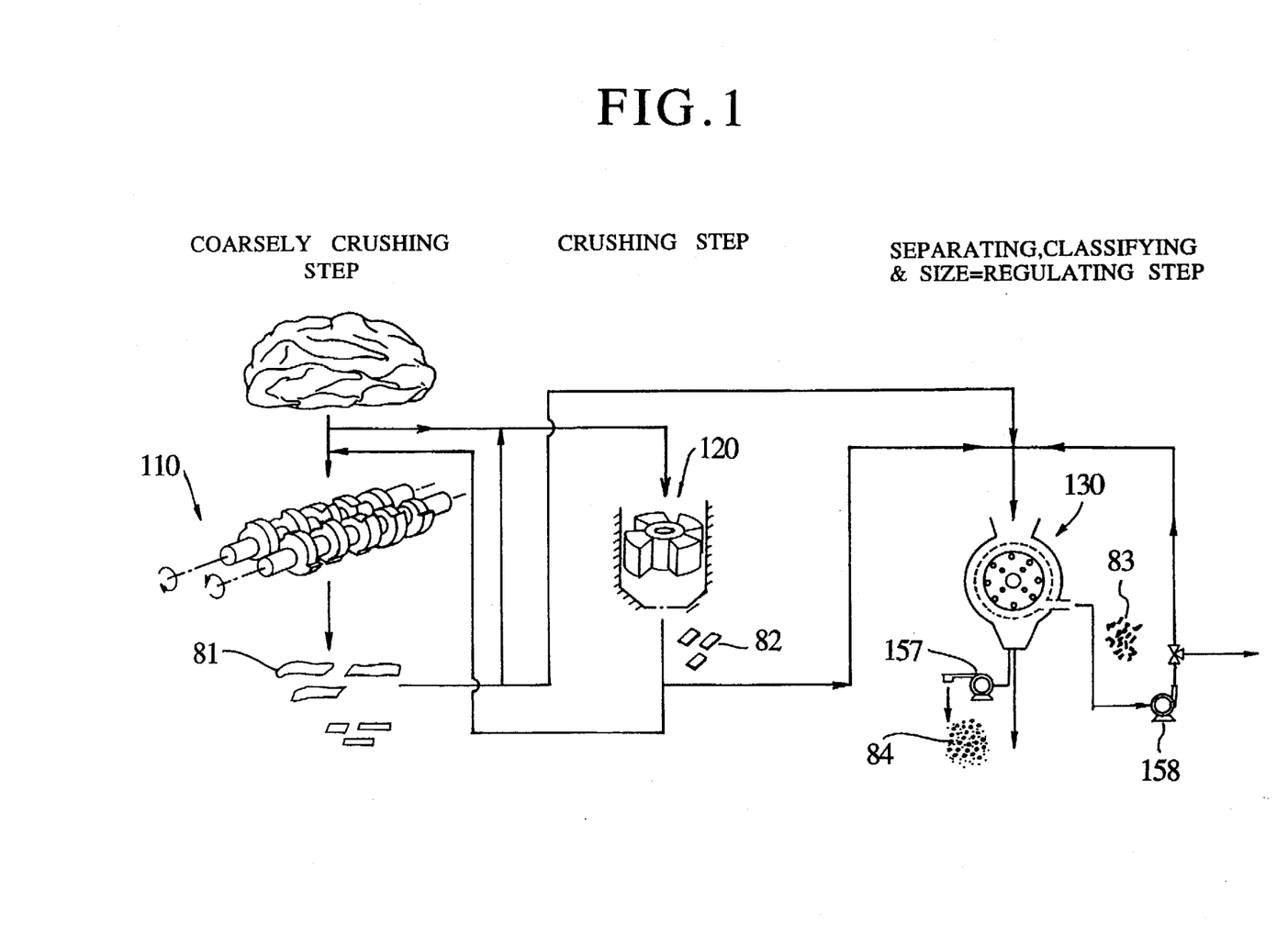
FIG. 1 is a schematic diagram of an embodiment of a method of recovering a resin material from waste film, illustrating the basic idea of the invention and the processing steps involved in the embodiment.

As illustrated in FIG. 1, it comprises steps of coarsely (primary) crushing, crushing and separating, classifying and size-regulating.

STEP 1: Coarsely Crushing Step

Crumpled masses of waste film of polyethylene coming mostly from agricultural tunnels are cut or otherwise crushed to pieces FIG. 1 to produce coarsely crushed pieces 81 that are smaller than 15×50 mm, preferably 30×30 mm in average and have an apparent. specific gravity between 0.19 and 0.23.

Coarsely Crushing Means

The coarsely crushing means crushes waste film to pieces having appropriate sizes and is referred to as a "crusher" for this embodiment.

FIG. 1 shows a crusher. The crusher 110 comprises a crusher main body having an inlet port for receiving waste film, a pair of inwardly rotating rotary shafts arranged in parallel with each other, each carrying thereon a plurality of rotary edges arranged at regular intervals, and claw-like edges arranged around the rotary shafts in such a way that each rotary edge is engaged with three corresponding claw-like edges arranged equiangularly along the outer peripheral surface of the rotary edge and projecting toward the rotary edge in order to crush and cut crumpled masses of waste film to pieces with appropriate sizes.

Crumpled masses of waste polyethylene film coming from agricultural tunnels are thrown into the crusher through the inlet port arranged at an upper position and then caught by the inwardly rotating rotary shafts, which continuously apply shearing and compression forces to the waste film by means of the outer periphery of the mutually engaged rotary edges to crush and cut the film and produce coarsely crushed pieces 81. The produced coarsely crushed pieces 81 are discharged from a discharge port disposed under the rotary edges of the two rotary shafts. At this stage of operation, the coarsely crushed pieces are dark as they stain agricultural chemicals, mud and other adherent foreign objects.

Note that the coarsely crushing means is not necessarily limited to a crusher having a configuration as described above and may be replaced by a guy-knacks crusher available from Horai Co., Ltd., a roll crusher available from Nara Machine Manufacturing Co., Ltd, a mono-cutter, a shredder or a crusher of a different type.

Figure 5:
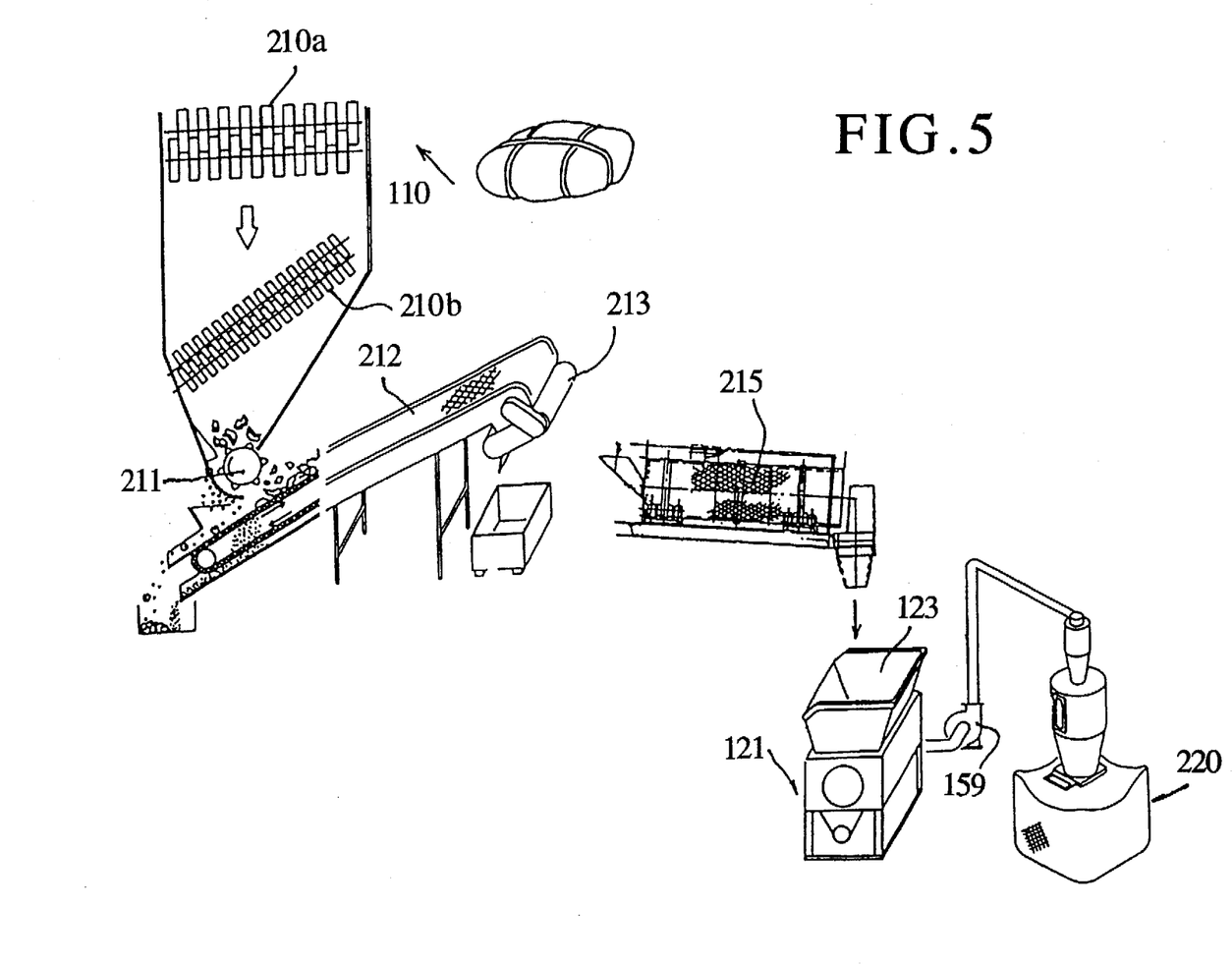
FIG. 5 is a schematic view of the coarsely crushing step and the crushing step of a method according to the invention.

In FIG. 5, a pair of such crushers 110 are vertically arranged to form two-stage type coarsely crushing means. The upper crusher 210a is arranged horizontally, while axis of the lower crusher 210b is inclined by 45° relative to the horizontal axis of the upper crusher. With such an arrangement, the processing capacity of the resin material recovering assembly can be remarkably increased.

Figure 2:
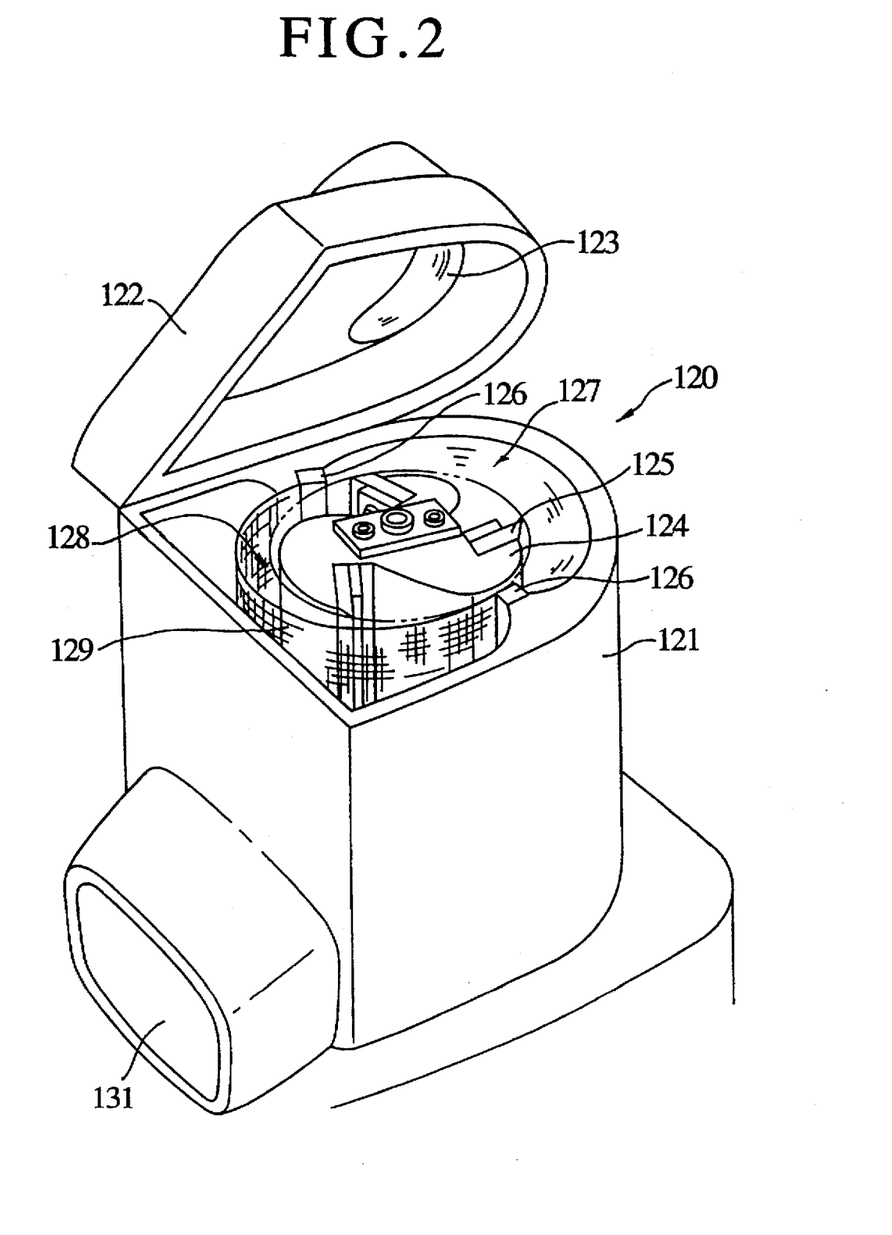
FIG. 2 is a schematic perspective view of a cutter mill (crushing and size-regulating means) that can be used in an embodiment of the invention.

Preferably, a loosener 211 is arranged under the housing of the crusher 110 to loosen the crushed waste film, or coarsely crushed pieces 81, falling down from the crusher 110 and make it easy to remove any pebble stones and sand grains that may be found within the waste film. A network conveyor 212 is arranged under the loosener 211 at an angle of about 45° inclined from the horizontal direction in order to sieve out pebble stones and sand grains, which can freely fall down through the network of the conveyor. Preferably, a magnetic sorter 213 is arranged under the forward end of the network conveyor 212 to sort out metal pieces and grains of corroded iron that may also be contained in the coarsely crushed pieces 81 if necessary, the coarsely crushed pieces 81 separated from metal pieces and grains of corroded iron are made to pass through a rotary sieve 215 made of a metal network to sort out fine pebble stones, sand grains and metal particles that may remain in the coarsely crushed pieces 81.
Step 2: Crushing Step Coarsely crushed pieces 81 with an average size of 15×50 mm coming from Step 1: Coarsely Crushing step are thereafter further crushed by crushing means as shown in FIGS. 1 and 2 to crushed small pieces 82 that are typically as small as 2×15 mm or 10×10 mm or may have an irregular polygonal form with a square not greater the 10 mm on a side. Note that, at this stage of operation, the crushed pieces carry agricultural chemicals, mud and other adherent foreign objects like the coarsely crushed pieces 81 produced from Step 1 (Coarsely Crushing Step).

Crushing Means

The crushing means cuts and crushes coarsely crushed pieces 81 to smaller pieces 82 for further treatment. For this embodiment, it is referred to as a "cutter mill" for the sake of convenience.

FIG. 2 shows a cutter mill 120 that can be used for the crushing means.

121 denotes a cutter mill main body housed in a cylindrical casing having an upper opening, which removably covered by a closure 122 provided with an inlet 123 for receiving coarsely crushed pieces 81 and feeding them into the cutter mill main body.

The cutter mill main body 121 comprises a cutter support 124 to be horizontally rotated by rotary drive means (not shown) borne by the bottom of the cutter mill main body 121 and three vertically elongated rotary edges 125 arranged equiangularly with an angle of 120° separating any adjacent rotary edges along the outer periphery of the cutter support 124, the front lines of the three rotary edges 125 being located on a same locus of rotation. A pair of fixed edges 126 are secured to the cutter mill main body 121 and arranged in such a way that they are symmetrically located relative to the locus of rotation of the rotary edges 125 and slightly separated from the locus of rotation of the rotary edges 125 so that the inside of the cutter mill main body 121 is divided into a feeding chamber 127 and a crushing cheer 128 by the two fixed edges 126, the cutter support 124 and the rotary edges 125. The inlet port the closure 122 communicates with the feeding chamber 127. The clearance between the two fixed edges 126 and the rotary edges 125 can be adjusted so that coarsely crushed pieces may be cut to desired dimensions or crushed further. The clearance of this embodiment is between 2 and 0.3 mm. The crushing chamber is partitioned by a mesh screen 129 that surrounds the locus of rotation of the rotary edges 125 between the two fixed edges 126. The screen 129 of this embodiment has meshes that allow crushed pieces having a edge of about 10 mm to pass through them. The cutter mill main body 121 is further provided with a discharge port located under the crushing chamber 128 for discharging crushed small pieces 82.

With a cutter mill 120 having a configuration as described above, coarsely crushed pieces 81 with dimensions of 15×15 mm coming from the crusher 110 of Step 1: Coarsely Crushing Step are introduced into the mill through the inlet port 123 of the closure 122 and cut to smaller pieces by means of the rotary edges 125 of the cutter support 124 driven to rotate by rotary drive means (not shown) and the fixed edges 126, which crushed small pieces 82 are not greater than 2×15 mm or 10×10 mm or may have an irregular polygonal form with any edges not greater than 10 mm although their forms and surface areas cannot be specifically definable and discharged through the discharge to proceed to the next step.

Note that the crushing means is not limited to a cutter and a hard crusher available from Horai Co., Ltd, in which the rotary shaft of the rotary edges 125 is horizontally arranged and the screen 129 between the two fixed edges 126 is located at a lower position. Also note that, at this stage of operation, the crushed small pieces 82 are opaque and dark although some the agricultural chemicals, mud and other adherent foreign objects carried by the coarsely crushed pieces 81 are removed.

If necessary, crushed small pieces 82 may be fed to a tank 220 having a cyclone by means of a blower 159 and stored there before they are fed Lo the next step.
Step 3: Separating, Classifying and Size-Regulating Step Crushed small pieces 82 of waste polyethylene film having an irregular polygonal form with a square not greater than 10 mm on a side and staining agricultural chemicals, mud, dirt, sand, debris of metal, crops (leaves, stalks) and glass and dusts coming from Step 2: Crushing Step are then subjected to a scraping impact force and crushed further to particles having an irregular polygonal form with a square not greater than 1 to 2 mm and then granulated to show cubic, cylindrical or any irregular forms with a square found between 1 and 10 mm, preferably 2 and 5 mm on each side, which granulated objects are then polished and size-regulated. At the same time, the foreign objects adhering to the crushed small pieces 82 are removed from the polyethylene by the scraping impact force so that polyethylene and other resin substances are recovered as a resin material from the waste film.

The above step may be repeated for a necessary number of times.

Separating, Classifying and Size-Regulating Means

As described above, by the separating, classifying and size-regulating means, crushed small pieces 82 of waste film of polyethylene, soft polyvinyl chloride film and other substances are crushed into fine pieces and polished and size-regulated. At the same time, it applies a scraping impact force to the crushed small pieces 82 to separate them from the foreign objects adhering to them and granulates the crushed small pieces 82. It is referred to a "separator" for this embodiment.

Figure 3:
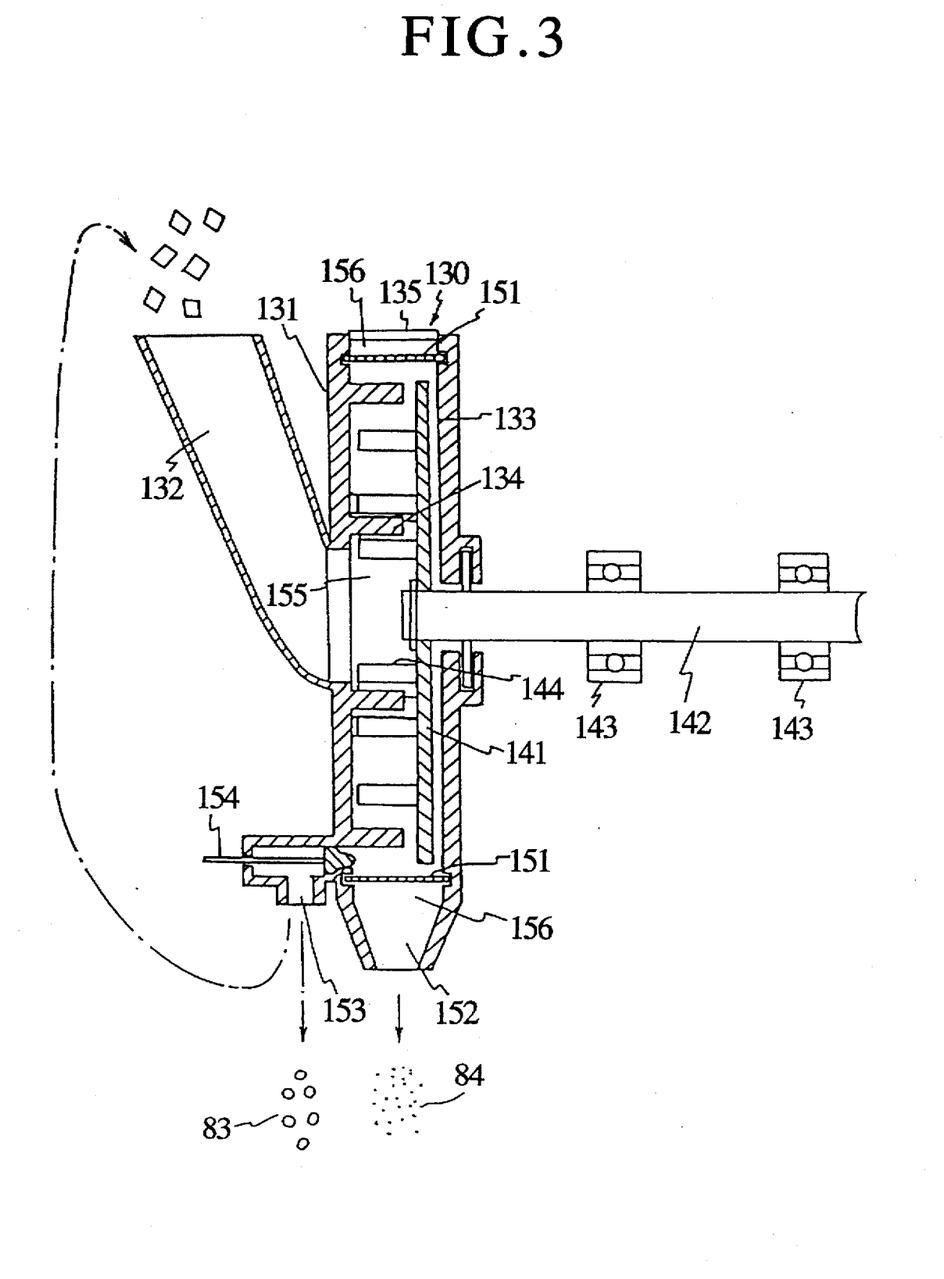
FIG. 3 is a schematic longitudinal sectional view of a polishing and size-regulating unit that can be used in an embodiment of the invention.
Figure 4:
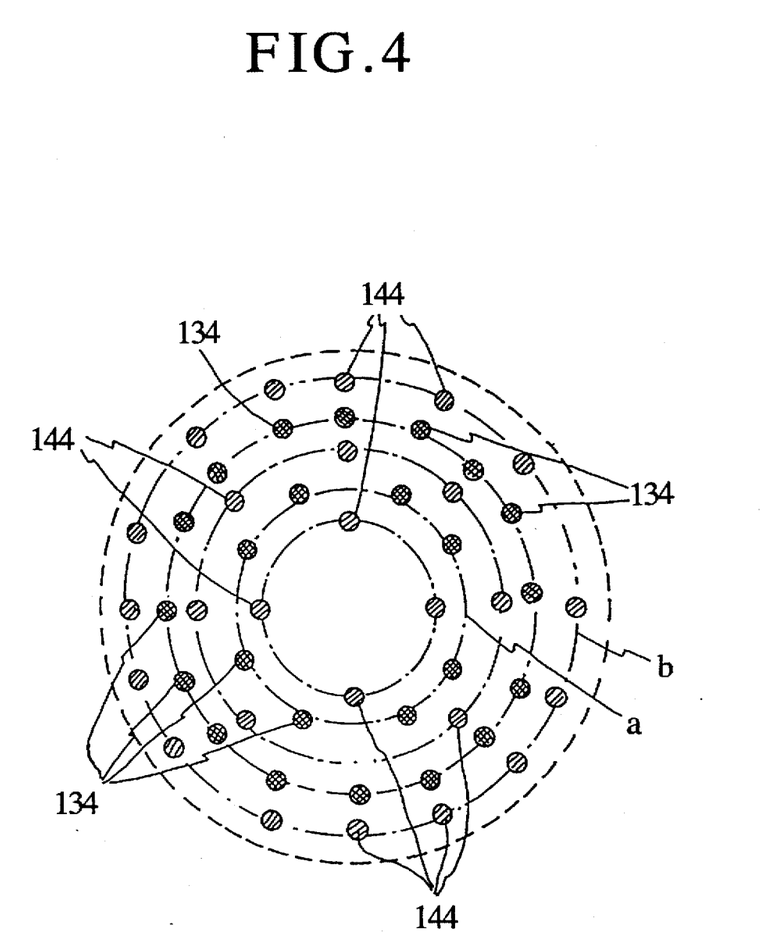
FIG. 4 is a front view of the unit of FIG. 3, illustrating operations for polishing and size-regulating.

Referring to FIGS. 3 and 4, the separator 130 comprises a fixed disc 131 having a central opening communicating with a feeding inlet port 132 for receiving crushed small pieces 82, a fixed end plate 133 arranged vis-a-vis the fixed disc 131 with a polishing/size-regulating space 155 provided therebetween, said fixed disc 131 and said fixed end plate 133 being secured to a peripheral plate 135 at the respective outer peripheries. A movable disc 141 to be driven to rotate by a rotary transversal shaft 142 is disposed in the polishing/size-regulating space 155 and the rotary transversal shaft 142 is carried by bearings 143, 143. Said rotary transversal shaft 142 is driven to rotate by a rotary drive means (not shown) such as a motor.

Fixed pins 134 are arranged on a number of coaxial circular loci "a" (FIG. 4) of rotation of the fixed disc 131 (relative to the movable disc 141), while movable pins 144 are arranged on a plurality of coaxial circular loci "b" of the movable disc 141 that are coaxial with but radially displaced from the circular loci a so that the fixed pins 134 and the movable pins 144 are interdigitally disposed and apply a scraping impact force to the crushed small pieces 82 whereby these pieces 82 are further crushed, polished and size-regulated. The separator 130 additionally comprises a screen 151, with given meshes formed by producing punched out pores having a desired diameter arranged between the outer periphery of the movable disc 141 and the peripheral plate 135 to produce a discharge space 156 between the peripheral plate 135 and the screen 151. A discharge port 152 is provided below the discharge space 156. As shown in FIG. 1, a blower 157 is provided by the discharge port 152 of the separator 130. While the screen 151 of this embodiment has 1 mm meshes, it may preferably have smaller meshes typically of 0.7 mm.

A collection port 153 is arranged under the screen 151 in the polishing/size-regulating space 155 and provided with a plug valve 154 for controlling the opening/closing operation of the collection port 153. As shown in FIG. 1, a blower 158 is arranged near the collection port 153 to draw air from the separator 130, which communicates with the feeding inlet port 132 by way of the blower 158.

Thus, with the separator 130 having a configuration as described above, as the rotary transversal shaft 142 is driven by drive means (not shown) to rotate the movable disc 141 and crushed small pieces 82 are fed into the feeding inlet port 132, the crushed small pieces 82 is subjected to a scraping impact force between the fixed and movable pins 134, 144 at the center of the polishing/size-regulating space 155, to a crushing or polishing/size-regulating effect and also to a centrifugal effect so that they are gradually crushed and size-regulated as they approach the outer periphery. During this process, the foreign object 84 adhering to the crushed small pieces 82 of polyethylene film including agricultural chemicals, mud, dirt, sand, debris of metal, crops (leaves, stalks) and crushed to small pieces with a square not greater than 1 mm on a side although their forms and surface areas cannot be specifically definable, while the resin material 13 of polyethylene film is crushed and granulated to show cubic, cylindrical or any irregular forms with 1 mm in diameter and 10 mm length, preferably with a square 2 to 5 mm on a side, which granulated objects are then polished and size-regulated, while they are dried before they are collected as a resin material of regularly sized granules. Some of the crushed small pieces 82 of the resin material may be crushed to become powder of particles with a square not greater than 1 mm on a side although their forms and surface areas cannot be specifically definable.

Figure 6:
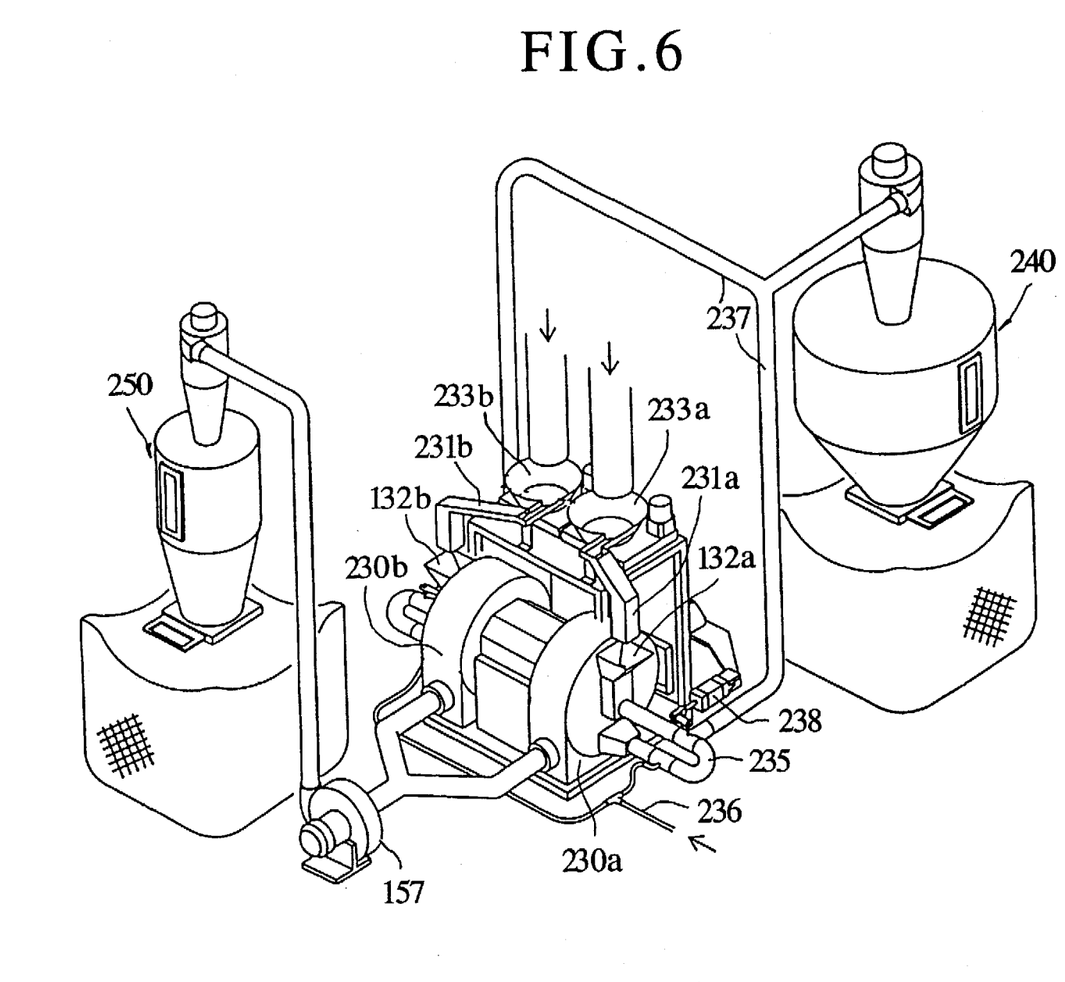
FIG. 6 is a schematic view of the separating, classifying and size-regulating step of a method of recovering a resin material from waste film according to the invention.

As shown in FIG. 6, a pair of similar separators 130 (230a, 230b) may be arranged side by side and driven by a common power source such that crushed small pieces 82 are fed by way of inlet ports 132a, 132b and vibration feeders 233a, 233b having respective shoots 231a, 231b disposed above the inlet ports 132a, 132b respectively.

The crushed adherent foreign objects 84 and a part of the crushed small pieces 82 of polyethylene film are made to pass through the screen 151 by the centrifugal effect of the movable pins 144 and classified in the discharge space 156, before they are drawn out to the outside byway of the discharge port 152 and the blower 157.

Meanwhile, the polished and size-regulated granules of the recovered resin material 83 mainly made of polyethylene film and the large adherent foreign objects that do not pass through the screen 151 remain on the screen 151. However, since the collection port 153 and the feeding inlet port 132 communicates with each other via the blower 158 when the plug valve 154 is open, the size-regulated granules of the resin material 83 collected from the collection port 153 and the large adherent foreign objects 84 that do not pass through the screen 151 are fed back to the feeding inlet port 132 and the large adherent foreign objects of mud, glass, metal and other materials are crushed before they are discharged through the discharge port 152. On the other hand, the granules of the recovered resin material 83 mainly made of polyethylene film and fed back to the feeding inlet port 132 are not so finely size-regulated nor polished as to pass through the screen 151 and therefore mostly remain on the screen 151.

The size-regulated granules of the recovered resin material are collected through the collection port 153 by opening the plug valve 154.

The blower 158 may be replaced or combined with means for feeding compressed air into the polishing/size-regulating space 155 of the separator 130 and connecting the fixed end plate 133 or a piping communicating with the collection port 153 to the feeding inlet port 132 so that larger adhering foreign objects that do not pass through the screen 151 may be fed back to the feeding inlet port 132.

As shown in FIG. 6, a piping 236 connected to a compressed air source (not shown) is arranged to communicate with the communication pipe 235 keeping the collection port in communication with the feeding inlet ports 132a, 132b. A rectifying plate may be arranged at the communicating area of the piping 236 in such a way that it operates so as to cause compressed air to mainly flow toward the feeding inlet port 132. The communication pipe 235 is connected to a branching pipe at an end thereof close to the feeding inlet ports 132a, 132b and a branching pipe 237 is disposed to communicate with a collection tank 249 for recovering size-regulated granules of the resin material. A three-way solenoid valve 238 may be arranged at the junction of the branching pipe 237 and switched periodically by means of a timer circuit to close the communication pipe 235 at the downstream end and open the branching pipe 237 so that the resin material remaining on the screen 151 may be drawn and collected by way of the branching pipe 237. Alternatively, the branching pipe 237 and the communication pipe 235 may be provided with respective solenoid valves so that they may be alternatively opened and closed.

The recovered resin material 83 is almost transparent or semitransparent and colorless or lightly white. In FIG. 6, reference numeral 250 denotes a collection tank for collecting and storing sand, dirt, agricultural chemicals, manure and so on from a piping that constantly communicates with the discharge port 152 byway of the blower 157.

In an experiment using the above described embodiment comprising the separator 130, 600 g of crushed small pieces 82 were fed to the separator 130 and the movable disc 141 was driven to rotate at 40 Hz at a rate of 1,900 rpm. Ninety (90%) by weight of the crushed small pieces 82 was granulated to particles that show a substantially cylindrical form having a diameter or width less than 1.2 mm and a length between 3 and 7 mm in two minutes, the remaining 10% was the pulverized adhering foreign objects and the resin material of polyethylene film that had been pulverized to powder. Thus, the embodiment could recover a resin material out of a large proportion of the waste film within a short period of time. A large separator 130 may be installed to raise the processing capacity of the embodiment.

A relatively low rate of revolution may preferably be selected for the movable disc 141 in order not to reduce the polyethylene film into too small granules. As a matter of fact, the rate of revolution of the movable disc 141 may be made as low as possible within the limit that allows the waste film of polyethylene to be granulated and size-regulated to a size greater than the mesh of the screen 151 in order to separate and feed back the foreign objects adhering to the crushed small pieces 82 such as agricultural chemicals, mud, dirt, sand, debris of metal, crops (leaves, stalks) and glass and dusts from the collection port 153 to the feeding inlet port 132 byway of the blower 158 and crush them again to fine particles by a scraping impact force. For example, the movable disc 141 may be driven to rotate at a rate as low as 1,200 rpm.

While the above embodiment has been described in terms of polyethylene film, other resin materials such as polyvinylchloride and polycarbonate may also be recovered in the form of size-regulated granules.

Steps 1 and 2 of the above described process may be interchanged or Step 2 may be omitted depending on the state of the waste film to be treated from the viewpoint that if it is rolled up, how and to what extent it is contaminated and so on.

The granules of the resin material recovered by the present invention may be directly fed to a molding machine or, alternatively, pelletized before fed to a molding machine for extrusion molding, compression molding or injection molding. Still alternatively, the recovered resin material may be mixed and kneaded with a virgin resin material to pelletize the mixture before it is fed to a molding machine. A filler containing one or more than one pigments may be added to the recovered resin material for pelletizing depending on the application. Coarsely crushed pieces may be made to containing cellulose in order to produce molded products, i.e., synthetic wood products by a patented method as disclosed in European Patent Specification Publication No. 5 516 513 B1 issued to the Applicant.

As described above, according to the invention, there is provided a resin material recovered from industrial wastes of plastic film in a relatively simple and easy manner by separating foreign objects such as agricultural chemicals, mud, dirt, sand, debris of metal, crops (leaves, stalks) and glass and dusts from waste film of resin materials simply by means of a scraping impact force so that the recovered resin material may be effectively and efficiently granulated to show desired dimensions for recycling purposes. There are also provided a method and an apparatus for recovering such a resin material from industrial wastes.

Unlike any comparable conventional methods, a method according to the invention does not require any large washing and drying facilities and hence can save precious water and fuel resources.

In addition, since it does not contaminate rivers and ground water, it is free from cumbersome processes of waste water disposal.

Thus, the broadest claims that follow are not directed to a machine that is configure in a specific way. Instead, said broadest claims are intended to protect the heart or essence of this breakthrough invention.

This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for recovering a resin material from industrial waste of plastic film by separating foreign objects adhering thereto comprising the steps of:

coarsely crushing waste film into a plurality of coarsely crushed pieces;

crushing the coarsely crushed pieces into crushed small pieces to be treated; and applying a scraping impact force to the individual crushed small pieces to separate the resin material and the adhering foreign objects and regulating the sizes of the crushed small pieces of the resin material by scraping said crushed small pieces of resin material between fixed and movable pins, while removing the separated adherent foreign objects by passing said foreign objects through the screen by a centrifugal effect of the movable pins and by remaining the resin material on the screen without being scraped into smaller pieces to pass the screen; and larger adhering foreign objects that do not pass through the screen are returned to the step off applying a scraping impact force by compressed air.

2. A method for recovering a resin material from industrial waste of plastic film according to claim 1, characterized in that the step of applying a scraping impact force to the individual crushed small pieces to separate the resin material and the adhering foreign objects and regulating the sizes of the crushed small pieces of the resin material is repeated for seriatim plural times.

3. An apparatus for recovering a resin material from industrial waste of plastic film by separating foreign objects adhering thereto comprising:

coarsely crushing means for coarsely crushing waste film to a plurality of coarsely crushed pieces;

crushing means for crushing coarsely crushed pieces into crushed small pieces to be treated;

stationary-side polishing and size-regulating means arranged on a fixed disc having a central opening communicating with a feeding inlet port for feeding the crushed small pieces and provided with sequentially arranged fixed pins on a plurality of circular loci of rotation;

movable-side polishing and size-regulating means arranged on a movable disc rotatably disposed opposite to said fixed disc and provided with sequentially arranged movable pins on a plurality of loci of rotation different from said fixed pins;

classifying means arranged on the perimeter of the combined fixed and movable pins and communicating with a discharge port for freely discharging separated adherent foreign objects with sizes smaller than a given size and collecting means for collecting recovered pieces of a resin material with sizes greater than a given size at a collection port;

separating, classifying and size-regulating means for applying a scraping impact force to coarsely crushed pieces between each of said paired fixed and movable pins to separate and classify the pieces of the resin material and the adherent foreign objects and to polish and regulate the size of the resin materials;

a piping being arranged in communication with the collection port side of a pipe communicating with said collection port and said feeding inlet port and being in communication with a compression air source and a branching pipe being arranged to make the piping branched at the feeding inlet port side and held in communication with a tank for collecting the size-regulated resin material; and a solenoid valve being disposed at a junction of the branching pipe.

4. An apparatus for recovering a resin material from industrial waste of plastic film according to claim 3, characterized in that said coarsely crushing means comprises a pair of crushers arranged vertically such that the axis of the upper crusher is horizontally disposed whereas that of the lower crusher is inclined by 45° relative to that of the upper crusher.

5. An apparatus for recovering a resin material from industrial waste of plastic film according to claim 4, wherein flow rectifying means is arranged at the communicating piping to feed compressed air to the feeding inlet port.

6. An apparatus for recovering a resin material from industrial waste of plastic film according to claim 4, wherein a loosener is arranged below a housing of said crusher to loosen coarsely crushed waste film and a net conveyor is arranged under the loosener.

7. An apparatus for recovering a resin material from industrial waste of plastic film according to claim 6, wherein a magnetic sorter is arranged under a forward end of said net conveyor and a rotary sieve is arranged at a downstream position of the magnetic sorter.

8. An apparatus for recovering a resin material from industrial waste of plastic film by separating foreign objects adhering thereto comprising:

crushing means for crushing waste film into a plurality of crushed small pieces to be treated;

stationary-side separating, classifying and size-regulating means arranged on a fixed disc having a central opening communicating with a feeding inlet port for feeding crushed small pieces and provided with sequentially arranged fixed pins on a plurality of circular loci of rotation;

movable-side separating, classifying and size-regulating means arranged on a movable disc rotatably disposed opposite to said fixed disc and provided with sequentially arranged movable pins on a plurality of loci of rotation different from said fixed pins;

classifying means arranged on the perimeter of the combined fixed and movable pins and communicating with a discharge port for freely discharging separated adherent foreign objects;

collecting means for collecting recovered pieces of a resin material with sizes greater than a given size at a collection port, said collection port and said feeding inlet port being in communication with each other so that said crushed small pieces to be treated collected at the collection port may be fed back to said feeding inlet port in said separating, classifying and size-regulating means;

a piping being in communication with the collection port side of a pipe communicating with said collection port and said feeding inlet port and being in communication with a compression air source and a branching pipe being arranged to make the piping branched at the feeding inlet port side and held in communication with a tank for collecting the size-regulated resin material; and a three-way solenoid valve being disposed at a junction of the branching pipe, wherein the pieces of the resin material are separated from the adherent foreign objects by applying a scraping impact force to the crushed small pieces to be treated between each of the paired fixed and movable pins, and classified and regulated for size in the separating, classifying and size-regulating means.

9. An apparatus for recovering a resin material from industrial waste of plastic film according to claim 8, wherein flow rectifying means is arranged at the communicating piping to feed compressed air to the feeding inlet port.

10. An apparatus for recovering a resin material from industrial waste of plastic film according to claim 8, wherein a loosener is arranged below a housing of said crushing means to loosen coarsely crushed waste film and a net conveyor is arranged under the loosener.

11. An apparatus for recovering a resin material from industrial waste of plastic film according to claim 10, wherein a magnetic sorter is arranged under a forward end of said net conveyor and a rotary sieve is arranged at a downstream position of the magnetic sorter.

* * * * *

UNITED STATES PATENT AND TRADEMARK OFFICE
CERTIFICATE OF CORRECTION

PATENT NO. : 5,738,286
DATED : Apr. 14, 1998
INVENTOR(S) : Sadao Nishibori

It is certified that error appears in the above-identified patent and that said Letters Patent is hereby corrected as shown below:

Column 5, lines 32-33, should read as follows:
"the coarsely crushed pieces 81. If necessary, the coarsely crushed pieces"

Column 6, Line 45 should read as follows:
"before they are fed to the next step."

Signed and Sealed this

Sixth Day of October, 1998

Attest:

BRUCE LEHMAN

Attesting Officer

Commissioner of Patents and Trademarks